United States Patent [19]
Ozaki

[11] Patent Number: 5,896,202
[45] Date of Patent: Apr. 20, 1999

[54] INFORMATION PROCESSING APPARATUS AND METHOD FOR ROTATING AN IMAGE BASED ON AN INTENDED PROCESS

[75] Inventor: Hidenori Ozaki, Kawasaki, Japan

[73] Assignee: Canon Kabushiki Kaisha, Tokyo, Japan

[21] Appl. No.: 08/688,948

[22] Filed: Jul. 31, 1996

[30] Foreign Application Priority Data

Aug. 2, 1995  [JP]  Japan .................................. 7-197540

[51] Int. Cl.[6] .............................. H04N 1/00; G03K 9/32
[52] U.S. Cl. ...................... 358/296; 358/438; 358/448; 382/296; 399/84
[58] Field of Search .......................... 358/296, 401, 358/406, 434, 438, 448, 449, 451, 452; 382/276, 293, 294, 296, 297; 399/1, 2, 9, 14, 15, 17, 81–86, 367–373

[56] References Cited

U.S. PATENT DOCUMENTS

| | | | |
|---|---|---|---|
| 5,077,811 | 12/1991 | Onda | 382/296 |
| 5,239,388 | 8/1993 | Matsumoto et al. | 358/296 X |
| 5,247,371 | 9/1993 | Hikawa et al. | 358/448 |
| 5,301,036 | 4/1994 | Barrett et al. | 358/448 |
| 5,343,304 | 8/1994 | Nakai et al. | 358/296 |
| 5,410,417 | 4/1995 | Kuznicki et al. | 358/444 X |
| 5,428,458 | 6/1995 | Aiba et al. | 358/434 |
| 5,659,639 | 8/1997 | Mahoney et al. | 382/276 X |

FOREIGN PATENT DOCUMENTS 0034941  9/1981  European Pat. Off. .

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An image processing apparatus is capable of rotating a read image into a desired direction according to the content of a mark sheet to be read prior to the originals. As a result, the operator need not pay particular attention to the direction in which he sets the originals on the reader unit. To this end, a detection unit detects an identifier on, or attached to, the original on the reader unit, a rotation unit rotates the read image, and an output unit for releasing the rotated image in accordance with the content of the mark sheet, for example by rotating the image in accordance with the receiving equipment.

32 Claims, 7 Drawing Sheets

INFORMATION PROCESSING APPARATUS AND METHOD FOR ROTATING AN IMAGE BASED ON AN INTENDED PROCESS

BACKGROUND OF THE INVENTION

1. Field of the Invention

The present invention relates to an image processing apparatus and method therefor, and more particularly to an image processing apparatus capable of sending an original image with a predetermined direction to another device and a method therefor.

2. Related Background Art

There is already known apparatus, such as a copying apparatus with a facsimile communication function or an electronic filing function. In such apparatus, originals are set on an automatic original feeder and the originals supplied in succession onto an original table are read, and the original images thus read are used for facsimile transmission or stored in a memory device. In image reading operation, for example in setting A4-sized originals on the automatic original feeder, the longer side of the original is usually set parallel to the line sensor, in order to reduce the time required for original scanning and for original feeding. However, because the shorter side of the A4 size is taken as the main scanning direction in the facsimile transmission, there is already known an apparatus capable of transmission, after rotation by 90°, of the images obtained by reading the originals which are set as explained above. In this manner it is possible to release the original images after exchange of the longer and shorter sides thereof However, in this conventional configuration, for example in the facsimile transmission, the original image is rotated by 90° only in a predetermined direction, so that the TTI information, attached at the transmission side for example at the top of the original image, may become directed opposite to the original image itself For example, if the originals are bent at an end, such originals tend to cause sheet jamming at the feed roller of the automatic original feeder if the bent end is set on the feeder closer to the feed roller. It is customary to set the originals in the opposite direction in such case, and the above-mentioned image transmission in the inverted direction occurs by such original setting.

Also in the case of storing the read image in the memory device by the electronic filing function, the image displayed based on the image data or printed and stapled may become vertically inverted depending on the setting direction of the original.

SUMMARY OF THE INVENTION

An object of the present invention is to provide an image processing apparatus not associated with the above-mentioned drawbacks and a method therefor.

Another object of the present invention is to provide an image processing apparatus capable of sending, to another device, an original image with a desired direction, without the operator paying attention to the setting direction of the original, and a method therefor.

Still another object of the present invention is to provide an image processing apparatus capable of judging the vertical and horizontal directions, and the top and the bottom, of the original image and rotating the original image in a direction according to the content of image processing, and a method therefor.

Still another object of the present invention is to provide an image processing apparatus capable of detecting an identifier on the sheet and rotating the original image according to the result of detection, and a method therefor.

Still other objects of the present invention, and the features thereof, will become fully apparent from the following detailed description, which is to be taken in conjunction with the attached drawings.

DESCRIPTION OF THE PREFERRED EMBODIMENTS

Now the present invention will be clarified in detail by an embodiment thereof, with reference to the attached drawings.

Figure 1:
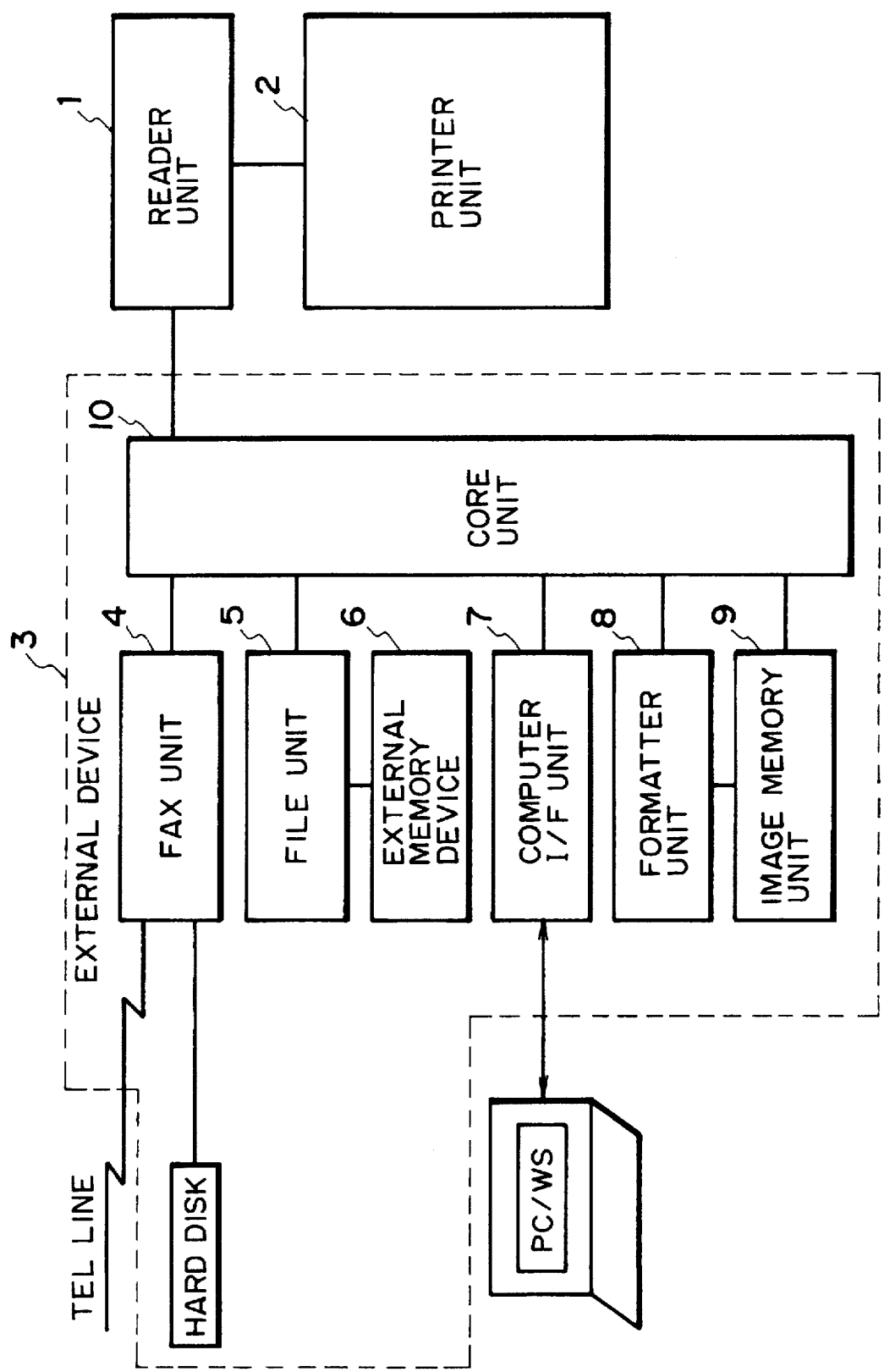
FIG. 1 is a block diagram of a composite image input/output apparatus constituting an embodiment of the present invention.

FIG. 1 is a block diagram showing the configuration of a composite image input/output apparatus having plural functions and constituting an embodiment of the present invention.

In FIG. 1, a reader unit 1 is an image input device for reading the image of an original and releasing image data. A printer unit 2 is an image output device provided with plural recording sheet cassettes for printing the image data as a visible image on a recording sheet in response to a print command.

An image input/output control device 3 is electrically connected with the reader unit 1 and has various functions. The image input/output control device 3 is provided, for example, with a facsimile unit 4, a file unit 5, a detachable external memory device 6 connected with the file unit 5, a computer interface unit 7 for connection with a computer, a formatter unit 8 for converting code information from a computer into a visible image, an image memory unit 9 for temporarily storing the information transferred from the computer, and a core unit 10 for controlling the above-mentioned units.

Figure 2:
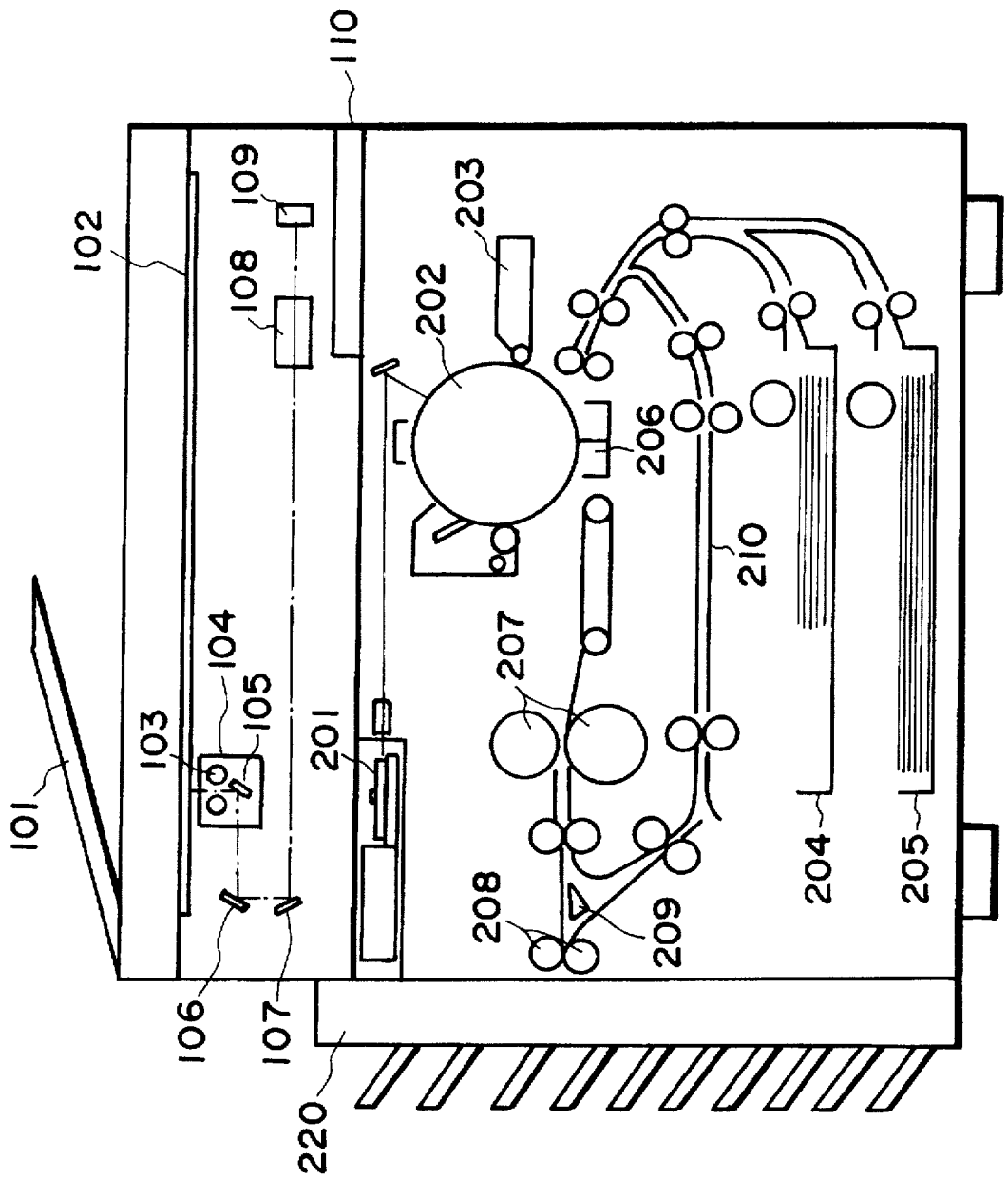
FIG. 2 is a cross-sectional view showing the configuration of a reader unit 1 and a printer unit 2.

FIG. 2 is a cross-sectional view showing the configuration of the reader unit 1 and the printer unit 2.

In the reader unit 1, sheet originals stacked on an original feeding device 101 are fed, one by one, onto an original supporting glass 102. When an original is fed to a predetermined position on the glass 102, a lamp 103 of the scanner unit is turned on and a scanner unit 104 starts to move to scan the original. The light reflected from the original is guided by mirrors 105, 106, 107 and a lens 108 and is entered, line by line, into a CCD image sensor 109 (hereinafter simply called CCD).

The image signal entered into the printer unit 2 is converted, by an exposure control unit 201, into a modulated optical signal for irradiating a photosensitive member 202.

A latent image formed on the photosensitive member 202 by the irradiating light is developed by a developing unit 203. In synchronization with the front end of the developed image, a recording sheet is transported from a recording sheet stacker unit 204 or 205 and is subjected to the transfer of the developed image in a transfer unit 206.

The transferred image is fixed in a fixing unit 207 to the recording sheet, which is discharged to the exterior by a discharge unit 208. The recording sheets discharged from the discharge unit 208 are placed, if the sorting function is in operation in a sorter 220, into respective bins thereof, but, if the sorting function is not in operation, onto the uppermost bin of the sorter.

In case the images read in succession are recorded on both sides of a recording sheet, the recording sheet subjected to image fixation on a side thereof in the fixing unit 207 is first transported to the discharge unit 208, and then the transporting direction is inverted and the recording sheet is transported through a direction switching member 209 to a sheet refeeding stacker unit 210. Then a next original is read in the same manner as explained above but the recording sheet is fed from the sheet refeeding stacker unit 210, whereby two original images can be recorded on the top and bottom sides of a recording sheet.

The image input/output control device 3 is connected with the reader unit 1 through a cable and the signals and functions are controlled by the core unit 10 of the control device 3.

The image input/output control device 3 is provided therein with a facsimile unit 4 for effecting facsimile transmission and reception, a file unit 5 for converting the information of various originals into electrical signals and effecting storage thereof in a magnetooptical disk (external memory device 6), a formatter unit 8 for developing code information, from the computer, into image information, a computer interface unit 7 for interfacing with a computer, an image memory unit 9 for storing the information read by the reader unit 1 and temporarily storing the information transferred from the computer, and a core unit 10 for controlling the above-mentioned functions.

Figure 3:
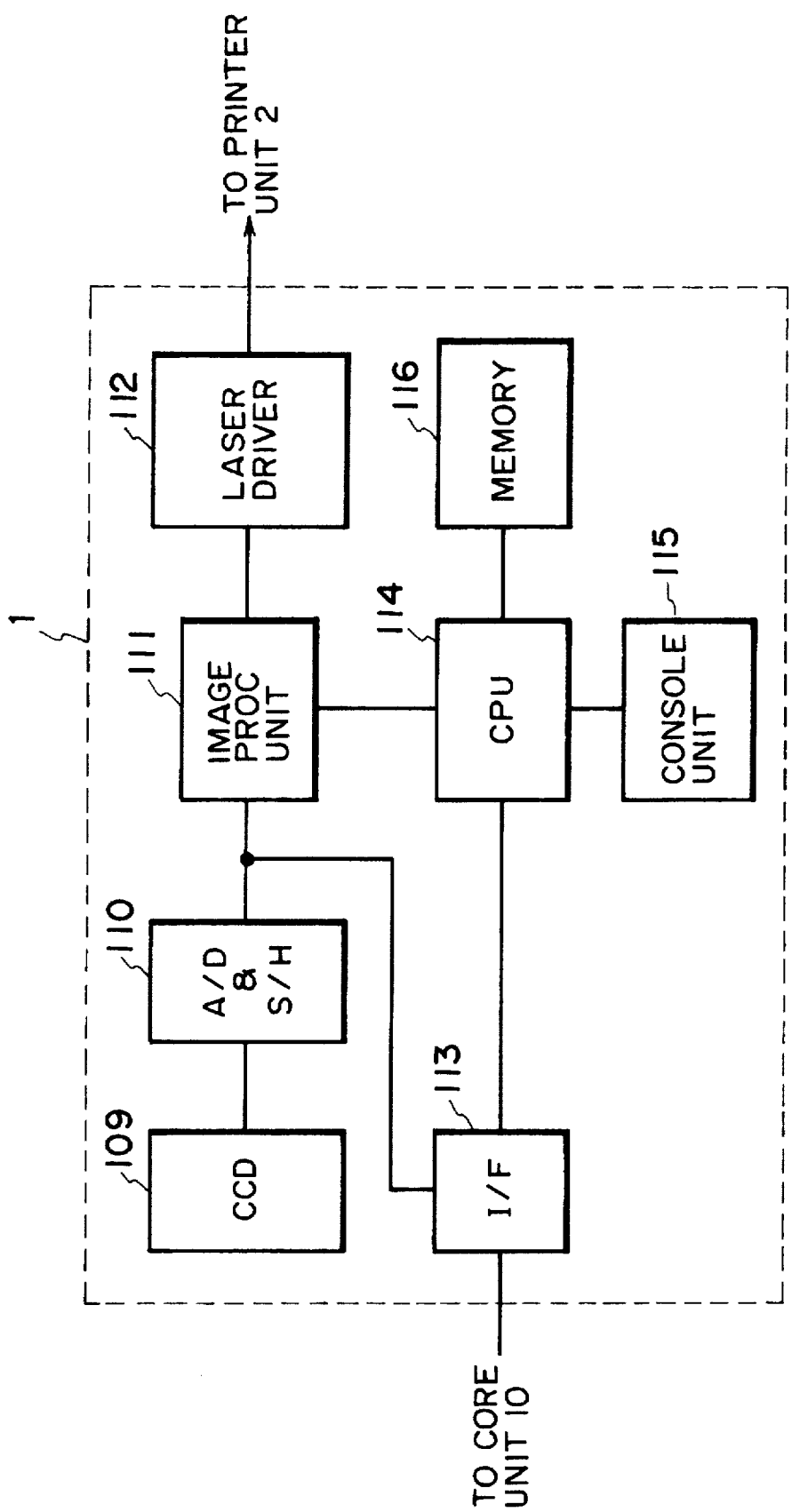
FIG. 3 is a schematic block diagram of the control system of the reader unit 1.

FIG. 3 is a schematic block diagram of the control system of the reader unit 1.

The reader unit 1 is provided therein with an A/D•SH unit 110 for effecting A/D conversion and shading correction on the signal read by the CCD 109, an image process unit 111 for effecting various signal processes such as color detection and contour processing on the image data from the A/D•SH unit 110, and a laser driver 112 for generating a laser drive signal, for supply to the printer unit 2, based on the image data from the image process unit 111.

The reader unit 1 is further provided with an interface unit 113 for exchanging various signals with the image input/output control device 3, whereby the image data therefrom through the interface unit 113 can be transferred to the printer unit 2 through the image process unit 111 and the laser driver 112.

The reader unit 1 is further provided with an operation unit 115 for effecting various settings on the composite image input/output apparatus.

The reader unit 1 is controlled by a CPU 114, according to a program stored in a memory 116. In addition, the memory 116 is provided with a memory area for various data.

Figure 4:
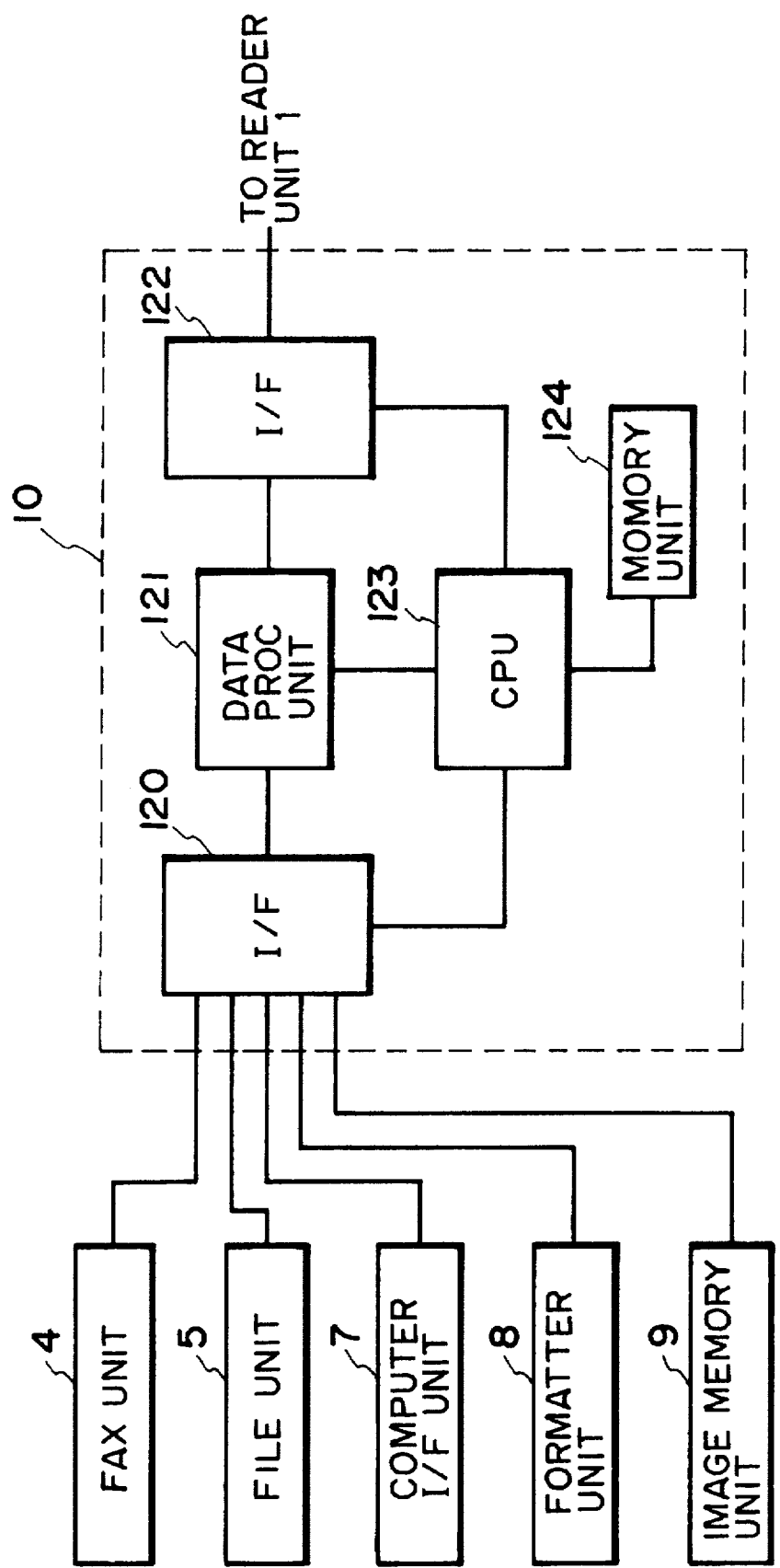
FIG. 4 is a schematic block diagram of the control system of a core unit 10.

FIG. 4 is a schematic block diagram of the control system of the core unit 10 mentioned above.

As shown in FIG. 4, the core unit 10 is provided with an interface unit 120 including a selector function for connecting the facsimile unit 4, and file unit 5, the computer interface unit 7, the formatter unit 8 and the image memory unit 9 mentioned above, a data process unit 121 for effecting various processes such as image magnification change or image rotation on the input data, and an interface unit 122 for data exchange with the reader unit 1.

Such core unit 10 is controlled by a CPU 123 according to a program stored in a memory 124, which is also provided with a memory area for various data.

In the following there will be explained the control sequence of the composite image input/output apparatus of the above-explained configuration.

At first the originals and a mark sheet, for setting the process for the images on the originals, are set, in the face-up state (with the image bearing side upwards), on the original feeding device 101, which feeds thus set plural originals, one by one, from the lowermost one. The above-mentioned mark sheet is set on the original feeding device 101, at the bottom of the originals constituting a single job.

However the above-explained setting method of the originals is merely an example and is modified to follow the original feeding device to be used. For example, if the original feeding is done from the top, the mark sheet is placed at the top. Also in a feeding device in which the originals are set in the face-down state, the originals are set accordingly. In any case, the sheets are so set that the mark sheet is read first and then the originals are read which are to be processed according to the setting made by the above-mentioned mark sheet.

Also the original reading need not necessarily be conducted with the original feeding device, and it is also possible to at first instruct, from the operation unit 115, the start of image reading of a series of jobs when placing the originals on the original supporting glass 102, then to effect the reading of the originals in succession, and, after the reading of all the originals belonging to the jobs, to instruct again the end of the job from the operation unit 115. Also in such operation, a setting mark sheet is read first, and then the originals are read which are to be processed according to the setting by the mark sheet.

In the following there will be explained an example of the mark sheet to be set together with the originals.

Figure 6:
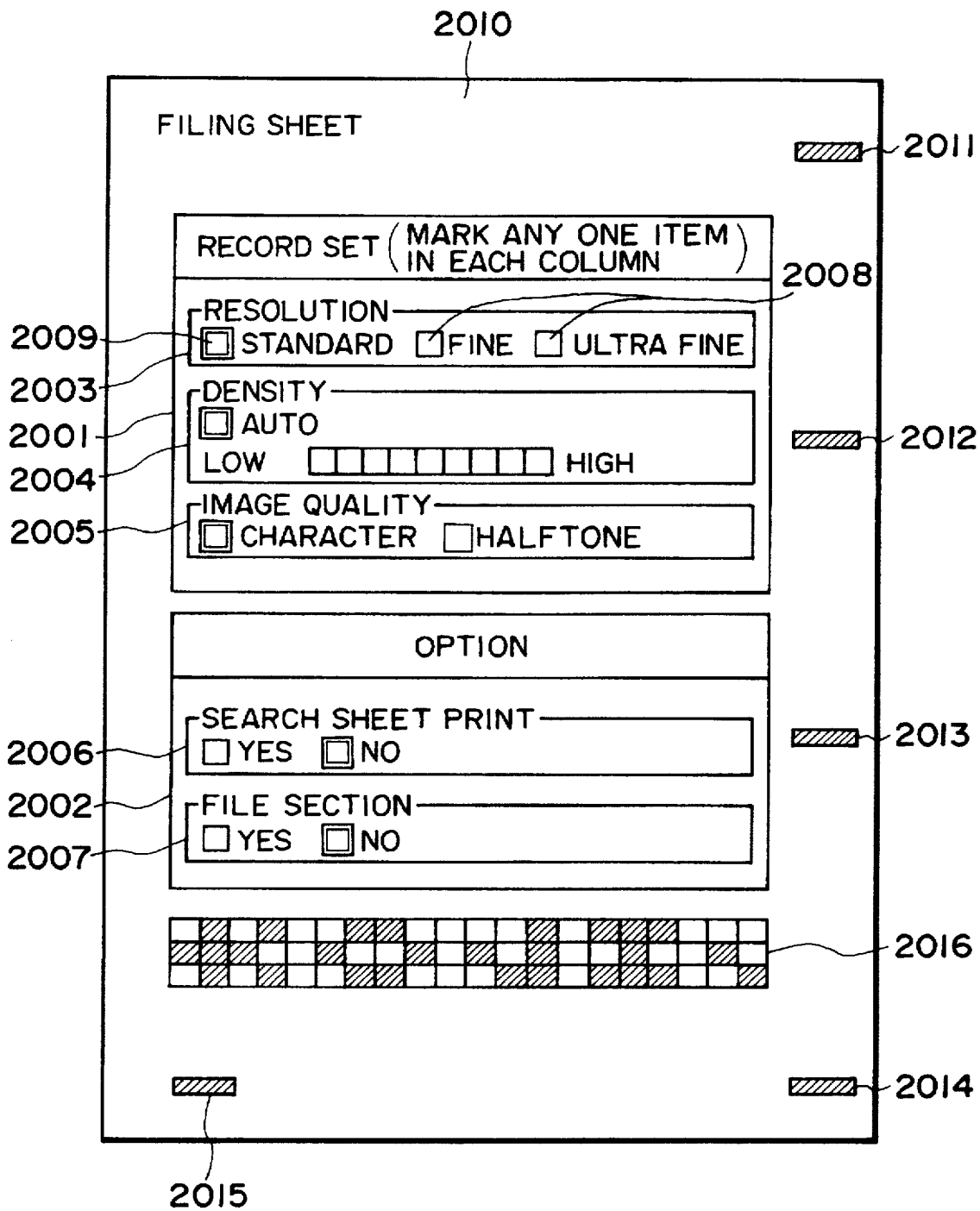
FIG. 6 is a view showing an example of the format of a reading mark sheet for image data filing.

FIG. 6 shows a mark sheet 2010 to be used for storing the image of the original, read by the reader unit 1, as a portrait image into the external memory device 6 connected to the file unit 5, wherein shown are patterns 2011–2015 for detecting the mark sheet and recognizing the setting direction of the originals, and a pattern 2016 for identifying the kind of the mark sheet. There are also provided a record setting column 2001 for setting the mode of storage of the original image in the external memory device 6; a reading resolution setting column 2003; a reading density setting column 2004; an image quality setting column 2005 for the read image; an option setting column 2002 for setting optional functions; a column 2006 for setting whether or not to output a search sheet for searching the original image stored in the external memory device 6; and a column 2007 for setting whether or not to effect file sectioning. If the file sectioning is set at YES, the file is divided with the mark sheet as a partition. If the file sectioning is set at NO, the original images set on the original feeding device 101 are handled as a file, and are stored in the external memory device 6 according to the content of the record setting column 2001 of the mark sheet. Blacking out a square such as 2008 provides a corresponding setting. If no square is blacked out, a setting is made corresponding to a double-framed square such as 2009.

Figure 7:
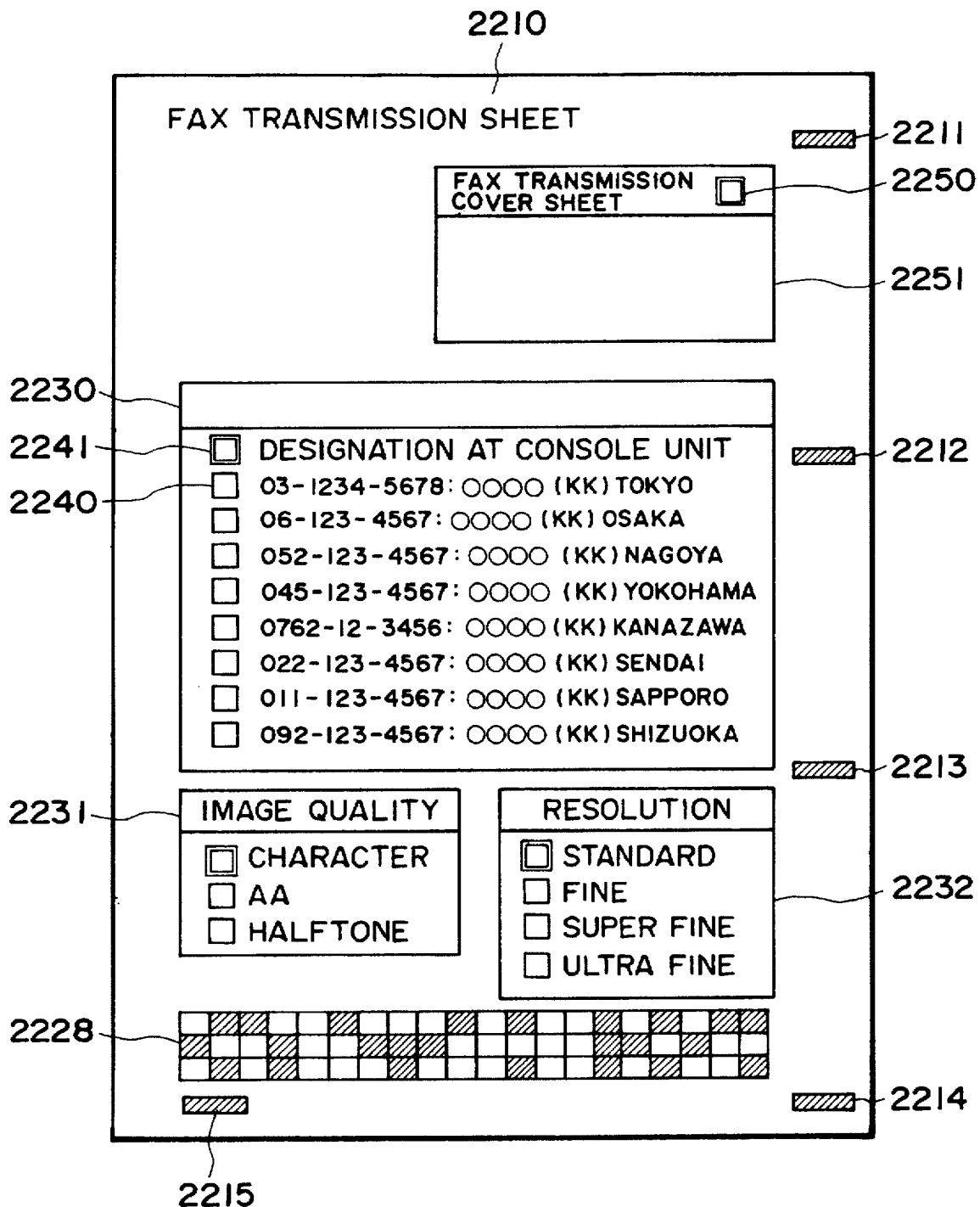
FIG. 7 is a view showing an example of the format of a reading mark sheet for facsimile transmission of image data.

FIG. 7 shows a mark sheet 2210 used for facsimile transmission, by the facsimile unit 4, of the original image read by the reader unit 1, wherein shown are patterns 2211–2215 for detecting the mark sheet and recognizing the setting direction of the originals, and a pattern 2228 for identifying the kind of the mark sheet. A destination FAX number column 2230 specifies the destination. Facsimile numbers are registered in advance in the memory 116, and the dialing is made according to a marked position (for example 2240). If marked at 2241, a display on the liquid crystal display of the operation unit 115 and a sound signal are generated to request the operator of the entry of the destination by the operation unit 115. 2231 is an image quality setting column for the read image, and 2232 is a reading resolution setting column. If a square 2250 is marked, a facsimile transmission form, stored in the memory 116, is transmitted prior to the transmission of the original images. A column 2251 is used for manuscript entry of a signature or a comment, which is added an image on the facsimile transmission form. As explained in the foregoing, if no square is blacked out, the setting is made corresponding to the double-framed square.

By setting the above-explained mark sheet and the originals on the original feeding device 101 and depressing a start key of the operation unit 115, there is initiated the feeding of the mark sheet and the originals. The originals and the mark sheet are set, in the same vertical direction, on the original feeding device 101.

Figure 5:
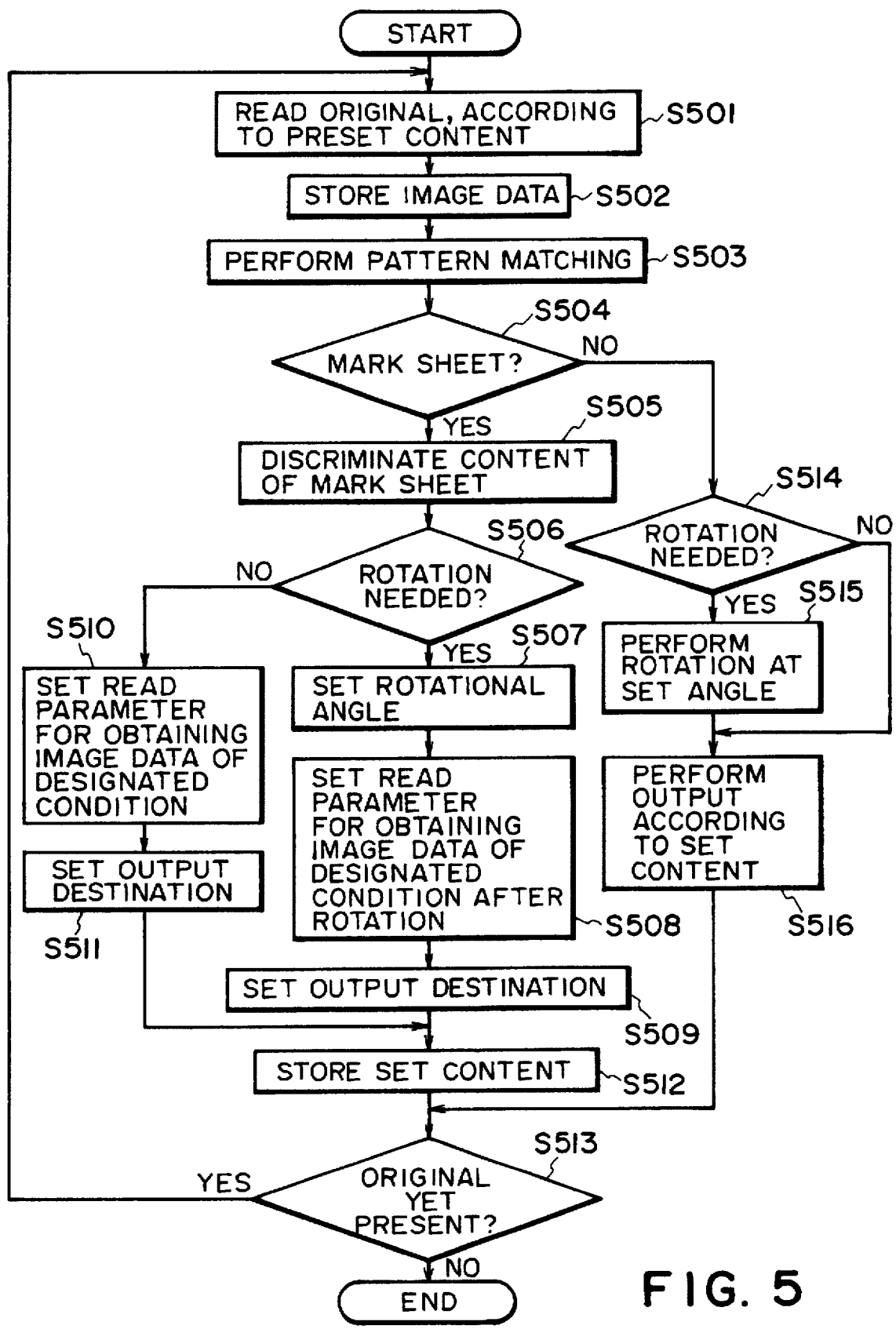
FIG. 5 is a flow chart showing the control sequence in a composite image input/output apparatus.

In the following there will be explained, with reference to a flow chart shown in FIG. 5, the control sequence after the start of sheet feeding, which is executed according to a program stored in the memory 116.

At first a step S501 reads, by the reader unit 1, the image of a sheet original transported onto the glass 102. Unless specified otherwise, the image reading is conducted with default conditions without image rotation, and with a resolution of 400×400 dpi, an automatic density control and a character-mode image quality (simple binarization), and the read image data are stored, in a step S502, in the image memory unit 9.

Then a step S503 discriminates, through comparison with the mark sheet patterns stored in advance in the memory 116, whether the image data stored in the image memory unit 9 contain the patterns 2011–2015, 2211–2215.

If a step S504 identifies that the image data are of a mark sheet, the sequence proceeds to a step S505 to identify the kind of the mark sheet, the setting direction of the originals and the reading parameters such as the resolution. Each marking column is read by calculating the offset coordinates from a reference position of the mark sheet. Also the presence of a mark in the marking column is judged, for example, by counting the number of black pixels in the marking column and discriminating whether this number of black pixels exceeds a predetermined threshold value. The threshold value is varied according to the reading mode (resolution, density and image quality).

Then a step S506 discriminates, based on the setting direction of the originals, whether rotation of the original image is required. More specifically, the original image of portrait type is stored in the external memory device 6, and, in case of filing, the filing is made in the portrait type and the necessity of image rotation is judged so as to avoid inversion of the image in the vertical direction, and, in case of facsimile transmission, the necessity of image rotation is judged in order that the transmission can be made from the upper end, in the shorter side, of the original.

In case image rotation is required, a step S507 sets the rotation angle (90°, 180° or 270°) for the original image.

Then a step S508 rotates the original image with the set angle and sets reading parameters for obtaining an image with the designated conditions (resolution etc.). More specifically, in case of rotation by 90° or 270°, a vertically oblong image is rotated into a horizontally oblong image, and, in such case, if the image resolution is different between the main and sub scanning directions, for example as in the standard reading resolution of 200 dpi in the main scanning direction and 100 dpi in the sub scanning direction, the reading parameters are so set as to obtain an image with the designated resolution after the rotation. In the case of the standard reading conditions, the reading parameters are so set as to effect image reading with a resolution of 100 dpi in the main scanning direction and 200 dpi in the sub scanning direction A next step S509 sets the output process for the original image according to the kind of the mark sheet. More specifically the destination of the data is set at the file unit 5 in case of filing, or at the facsimile unit 4 in case of facsimile transmission. If the designation of facsimile transmission is not marked, a display requesting the input of designation is made on the operation unit 115.

On the other hand, if a step S506 identifies that the image rotation is not required, the sequence proceeds to a step S510 for setting the reading parameters for reading the original image with the conditions designated on the mark sheet. Then a step S511 sets, as in the step S509, the output destination (file unit 5 or the destination of transmission through the facsimile unit 4) according to the kind of the mark sheet. If the destination of facsimile transmission is not designated, there is given a display requesting the input of the destination.

Then a step S512 stores the content of the foregoing settings, in a predetermined area of the memory 116. If a step S513 identifies that a sheet to be read still remains, the sequence returns to the step S501 to continue the original reading. Then a step S512 effects setting according to the content of the mark sheet and original reading according to the reading parameters stored in the memory 116. Thereafter the process is repeated in the same manner.

On the other hand, if the step S504 identifies that the read sheet is not a mark sheet, the sequence proceeds to a step S514 to discriminate whether the read image data need to be rotated, according whether a rotation angle (90°, 180° or 270°) is stored in the memory 116.

In case of image rotation, a step S515 effects image rotation by the data process unit 121, with the angle stored in the memory 116.

A next step S516 effects output of the image data according to the content stored in the memory 116. The image data are transferred, in case of image filing, to the file unit 5 and stored in the external memory device 6, or, in case of facsimile transmission, transmitted through the facsimile unit 4 to the designated destination device according to a known facsimile transmission protocol. The output process is not stored in the memory 116 if the mark sheet has not been read. In such case a local copying operation is executed by sending the read image data to the printer unit 2 for printout operation therein.

The embodiment explained in the foregoing avoids inversion of the original image in the vertical direction, in the case of image filing or facsimile transmission, without requiring particular attention of the operator on the setting direction of the originals.

Also as the processing of the original images is executed by the mark sheet, the setting for the image process is facilitated for the operator and the image reading is also made easier for the apparatus.

Also as the mark sheet is prepared separately from the originals, it is not necessary to attach a mark, for example indicating rotation, to the original, so that the originals need not be smeared.

Also as the processing is executed by reading the content of the process marked on the mark sheet, the operator is only required to set the originals and depress the start key.

Also, once the content of the mark sheet is read, the originals fed thereafter are processed with the content set by the mark sheet, so that the processing speed can be increased.

Furthermore, the process desired by the user can be realized advantageously, without complex operations on the operation unit 115.

The mark sheet to be employed in the present invention need not be limited to one, but there may be employed plural mark sheets according to the content of the setting.

The present invention is applicable not only to a system consisting of plural equipment (such as a host computer, interface devices, readers, printers etc.) but also to an apparatus consisting of a single equipment (such as a copying apparatus or a facsimile apparatus).

The present invention also includes a case of supplying a computer in an apparatus or a system connected to various devices with program codes of a software for realizing the function of the foregoing embodiment and causing the computer (CPU or MPU) of the apparatus or the system to operate the devices according to the stored program.

In such case, the program codes themselves of the above-mentioned software realize the function of the foregoing embodiment, and such program codes and means for supplying the computer with such program codes, for example a memory medium storing such program codes constitute the present invention.

For storing such program codes, there may be employed various memory media, such as a floppy disk, a hard disk, an optical disk, a magnetooptical disk, a CD-ROM, a magnetic tape, a non-volatile memory card and a ROM.

Also such memory medium may be made detachable and applied to another apparatus capable of decoding the program codes stored in the memory medium.

Furthermore, the present invention naturally includes such program codes where the function of the foregoing embodiment is realized not only by the execution of such supplied program codes by the computer but also by cooperation with an operating system or another application software functioning in the computer.

Furthermore, the present invention naturally includes a case where the supplied program codes are stored in a memory provided in a function expanding board of the computer or a function expanding unit connected thereto and a CPU provided in such function expanding board or such function expanding unit executes the actual process or a part thereof according to the instructions of such program codes, thereby realizing the function of the foregoing embodiment.

In the embodiment explained in the foregoing, the identifier attached to a read sheet is detected and the read original image is rotated according to the result of such detection, so that the original image can be supplied to another device in a desired image direction, without particular attention of the operator on the setting direction of the originals.

The present invention has been explained by a preferred embodiment thereof, but the present invention is by no means limited to such embodiment and is subjected to various modifications within the scope and spirit of the appended claims.

What is claimed is:

1. An image processing apparatus comprising:
   reader means for reading an original to provide a read image;
   detection means for detecting an identifier on the original;
   rotation means for rotating the read image in accordance with the identifier to provide a rotated image; and
   output means for outputting the rotated image to a destination device,
   wherein said rotation means rotates the read image in accordance with the destination device.

2. An image processing apparatus according to claim 1, further comprising setting means for setting an angle of rotation in accordance with the identifier, wherein said rotation means rotates the read image by the angle of rotation to provide the rotated image.

3. An image processing apparatus according to claim 1, further comprising discrimination means for discriminating a kind of the original.

4. An image processing apparatus according to claim 3, wherein when the identifier identifies the original as an original for setting a content of a process to be performed, said discrimination means discriminates that the original is a mark sheet.

5. An image processing apparatus according to claim 3, wherein when the identifier identifies the original as an original to be output, said discrimination means discriminates that the original is an image data sheet.

6. An image processing apparatus according to claim 3, further comprising:
   identification means for, when the identifier identifies a first original as an original for setting a content of a process to be performed, identifying the content of the process; and
   process means for, when the identifier identifies a second original as an original to be output, processing the second original according to the content of the process.

7. An apparatus according to claim 1, wherein, in a case where said output means outputs the processed image to a facsimile device, said rotation means controls the rotation operation such that the processed image is output beginning with image data corresponding to a shorter side of the original.

8. An apparatus according to claim 1, wherein, in a case where said output means outputs the processed image to a filing device and the read image is a portrait image, said rotation means controls the rotation operation such that the processed image is stored in the filing device as the portrait image.

9. An apparatus according to claim 1, wherein said output means outputs a processed image of an original other than the original on which the identifier is provided.

10. An image processing apparatus comprising:
    reader means for reading an original to provide a read image, said reading means further reading an instruction sheet to determine a kind of the instruction sheet;
    setting means for setting a content of a process to be performed on the read image based on the kind of the instruction sheet;

judgment means for judging a direction and a top side of the original based on the instruction sheet;

determination means for determining an angle of rotation for the read image according to both the content set by said setting means and a result of judgment by said judgment means;

rotation means for rotating the read image by the angle of rotation determined by said determination means to provide a rotated image; and processing means for processing the rotated image in accordance with the content of the process set by said setting means to provide a processed image.

11. An image processing apparatus according to claim 10, further comprising transmission means for transmitting the processed image.

12. An image processing apparatus according to claim 10, further comprising memory means for storing the processed image in a memory medium.

13. An image processing apparatus according to claim 10, wherein when the kind of instruction sheet is a predetermined sheet bearing a pattern, said setting means sets the content of the process based on the pattern.

14. An image processing apparatus according to claim 10, wherein said judgment means judges the direction and the top side of the original based on a detected position of a predetermined pattern on a predetermined kind of instruction sheet.

15. An image processing apparatus according to claim 10, wherein, in a case where the content of the process set by said setting means is for executing a facsimile transmission, said determination means determines the angle of rotation such that said processing means outputs the processed image beginning with image data corresponding to a shorter side of the original.

16. An image processing apparatus according to claim 10, wherein, in a case where the content of process set by said setting means is for storing a portrait image, said determination means determines the angle of rotation such that the processed image is stored in a filing device as the portrait image.

17. An image processing method comprising the steps of:
reading an original to provide a read image;
detecting an identifier on the original;
rotating the read image in accordance with the identifier to provide a rotated image; and
outputting the rotated image to a destination device,
wherein said rotation step rotates the read image in accordance with the destination device.

18. A method according to claim 17, further comprising a setting step of setting an angle of rotation in accordance with the identifier, wherein said rotation step rotates the read image by the angle of rotation to provide the rotated image.

19. A method according to claim 17, further comprising a discrimination step of discriminating a kind of the original.

20. A method according to claim 19, wherein when the identifier identifies the original as an original for setting a content of a process to be performed, said discrimination step discriminates that the original is a mark sheet.

21. A method according to claim 19, wherein when the identifier identifies the original as an original to be output, said discrimination step discriminates that the original is an image data sheet.

22. A method according to claim 19, further comprising:
an identification step of, when the identifier identifies a first original as an original for setting a content of a process to be performed, identifying the content of the process; and a process step of, when the identifier identifies a second original as an original to be output, processing the second original according to the content of the process.

23. A method according to claim 17, wherein, in a case where said output step outputs the processed image to a facsimile device, said rotation step controls the rotation operation such that the processed image is output beginning with image data corresponding to a shorter side of the original.

24. A method according to claim 17, wherein, in a case where said output step outputs the processed image to a filing device and the read image is a portrait image, said rotation step controls the rotation operation such that the processed image is stored in the filing device as the portrait image.

25. A method according to claim 17, wherein said output step outputs a processed image of an original other than the original on which the identifier is provided.

26. An image processing method comprising the steps of:
reading an original to provide a read image, said reading step further reading an instruction sheet to determine a kind of the instruction sheet;

setting a content of a process to be performed on the read image based on the kind of the instruction sheet;

judging a direction and a top side of the original based on the instruction sheet;

determining an angle of rotation for the read image according to both the content set by said setting step and a result of judgment by said judgment step;

rotating the read image by the angle of rotation determined by said determining step to provide a rotated image; and processing the rotated image in accordance with the content of the process set by said setting step to provide a processed image.

27. A method according to claim 26, further comprising a transmission step of transmitting the processed image.

28. A method according to claim 26, further comprising a storing step of storing the processed image in a memory medium.

29. A method according to claim 26, wherein when the kind of instruction sheet is a predetermined sheet bearing a pattern, said setting stay sets the content of the process based on the pattern.

30. A method according to claim 26, wherein said judgment step judges the direction and the top side of the original based on a detected position of a predetermined pattern on a predetermined kind of instruction sheet.

31. A method according to claim 26, wherein, in a case where the content of the process set by said setting step is for executing a facsimile transmission, said determining step determines the angle of rotation such that said processing step outputs the processed image beginning with image data corresponding to a shorter side of the original.

32. A method according to claim 26, wherein, in a case where the content of process set by said setting step is for storing a portrait image, said determining step determines the angle of rotation such that the processed image is stored in a filing device as the portrait image.

* * * * *

UNITED STATES PATENT AND TRADEMARK OFFICE
CERTIFICATE OF CORRECTION

PATENT NO. : 5,896,202
DATED : April 20, 1999
INVENTOR(S) : HIDENORI OZAKI

It is certified that error appears in the above-identified patent and that said Letters Patent is hereby corrected as shown below:

COLUMN 10

Line 47, "stay" should read --step--.

Signed and Sealed this

Twenty-third Day of November, 1999

Attest:

Q. TODD DICKINSON

*Attesting Officer*      *Acting Commissioner of Patents and Trademarks*